(12) United States Patent
Buyukkalender et al.

(10) Patent No.: US 11,799,188 B2
(45) Date of Patent: Oct. 24, 2023

(54) METHOD FOR MANUFACTURING A RADIOFREQUENCY ANTENNA ON A SUBSTRATE AND ANTENNA THUS OBTAINED

(71) Applicant: THALES DIS FRANCE SAS, Meudon (FR)

(72) Inventors: Arek Buyukkalender, Gemenos (FR); Jean-Luc Meridiano, Gemenos (FR); Lucile Mendez, Gemenos (FR); Frédérick Seban, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 12 days.

(21) Appl. No.: 15/770,511

(22) PCT Filed: Nov. 3, 2016

(86) PCT No.: PCT/EP2016/076617
§ 371 (c)(1),
(2) Date: Apr. 24, 2018

(87) PCT Pub. No.: WO2017/077010
PCT Pub. Date: May 11, 2017

(65) Prior Publication Data
US 2018/0233805 A1    Aug. 16, 2018

(30) Foreign Application Priority Data
Nov. 5, 2015    (EP) ...................................... 15306758

(51) Int. Cl.
*H01Q 7/06*    (2006.01)
*H01Q 1/22*    (2006.01)
(Continued)

(52) U.S. Cl.
CPC ...... *H01Q 1/2225* (2013.01); *G06K 19/07779* (2013.01); *G06K 19/07788* (2013.01);
(Continued)

(58) Field of Classification Search
CPC .......... H01Q 1/2225; H01Q 7/00; H01Q 7/06; G06K 19/07788; G06K 19/07779; G06K 19/07792
See application file for complete search history.

(56) References Cited

U.S. PATENT DOCUMENTS 3,906,509 A * 9/1975 DuHamel .............. H01Q 1/362
343/895
5,986,621 A * 11/1999 Barts ...................... H01Q 11/08
343/895
(Continued)

FOREIGN PATENT DOCUMENTS

JP          3956172 B2    8/2007
WO    WO 2014/199886 A1    12/2014

OTHER PUBLICATIONS

International Search Report (PCT/ISA/210) dated Jan. 12, 2017, by the European Patent Office as the International Searching Authority for International Application No. PCT/EP2016/076617.
(Continued)

*Primary Examiner* — Hai V Tran
*Assistant Examiner* — Bamidele A Jegede

(57) ABSTRACT

The invention relates to a method for manufacturing an antenna for a radiofrequency transponder, said antenna including a spiral comprising turns which extend, at least in part, over an insulating substrate; the method is characterised in that it includes the step ac-cording to which at least one first portion of each turn is deposited on said substrate at a first plane level, at least one second portion of each turn being formed or kept at a distance from the first plane level of the substrate, the axis of the spiral being parallel to the (Continued)

plane of the substrate. The invention also relates to a portable electronic object comprising, in a fixed or removable manner, the obtained antenna.

7 Claims, 2 Drawing Sheets

(51) Int. Cl.
  *G06K 19/077* (2006.01)
  *H01Q 7/00* (2006.01)
(52) U.S. Cl.
  CPC ......... *G06K 19/07792* (2013.01); *H01Q 7/00* (2013.01); *H01Q 7/06* (2013.01)

(56) References Cited

U.S. PATENT DOCUMENTS

| | | | | |
|---|---|---|---|---|
| 6,201,500 | B1* | 3/2001 | Fujikawa | H01Q 1/244 343/702 |
| 8,860,620 | B2* | 10/2014 | Kitano | H01Q 11/08 343/791 |
| 9,252,493 | B2* | 2/2016 | Buyukkalender | G06K 19/07749 |
| 2006/0124753 | A1* | 6/2006 | Scholz | G06K 19/07749 235/492 |
| 2007/0095913 | A1* | 5/2007 | Takahashi | H01Q 7/00 235/492 |
| 2008/0003457 | A1* | 1/2008 | Endo | H01Q 7/08 428/692.1 |
| 2008/0198078 | A1* | 8/2008 | Caruana | G06K 19/07749 343/745 |
| 2009/0096694 | A1* | 4/2009 | Ito | H01Q 1/243 343/788 |
| 2009/0109102 | A1* | 4/2009 | Dokai | G06K 7/10178 343/702 |
| 2010/0197245 | A1* | 8/2010 | Lahoui | H01Q 1/40 455/83 |
| 2010/0273469 | A1* | 10/2010 | Seban | G06K 19/07309 455/418 |
| 2011/0011939 | A1* | 1/2011 | Seah | G06K 19/07749 235/492 |
| 2011/0024510 | A1* | 2/2011 | Kato | G06K 19/07749 235/492 |
| 2011/0031320 | A1* | 2/2011 | Kato | G06K 19/07749 235/492 |
| 2011/0275318 | A1* | 11/2011 | Sato | H01Q 1/2208 455/41.1 |
| 2012/0038443 | A1* | 2/2012 | Kubo | H01Q 1/2225 336/90 |
| 2012/0074233 | A1* | 3/2012 | Finn | G06K 19/07747 235/492 |
| 2012/0086556 | A1* | 4/2012 | Ikemoto | G06K 19/07749 340/10.1 |
| 2012/0162028 | A1* | 6/2012 | Kubo | H01Q 1/528 343/788 |
| 2012/0326931 | A1* | 12/2012 | Murayama | H01Q 7/00 343/702 |
| 2013/0062419 | A1* | 3/2013 | Finn | H01Q 1/2225 235/492 |
| 2013/0075477 | A1* | 3/2013 | Finn | G06K 19/07794 235/492 |
| 2013/0154891 | A1* | 6/2013 | Kubo | G06K 19/0779 343/788 |
| 2013/0181876 | A1* | 7/2013 | Miura | G06K 7/10316 343/788 |
| 2013/0299598 | A1* | 11/2013 | Finn | H01Q 1/2225 235/492 |
| 2013/0337742 | A1* | 12/2013 | Arnoux | G06K 7/10079 455/39 |
| 2014/0035793 | A1* | 2/2014 | Kato | H01Q 7/06 343/867 |
| 2014/0043196 | A1* | 2/2014 | Gouchi | H01Q 1/2225 343/788 |
| 2014/0049436 | A1* | 2/2014 | Kubo | H01Q 1/48 343/788 |
| 2014/0062827 | A1* | 3/2014 | Kato | H01Q 1/50 343/856 |
| 2014/0091149 | A1* | 4/2014 | Finn | H01Q 21/29 29/850 |
| 2014/0131453 | A1* | 5/2014 | Lahoui | G06K 19/07749 235/492 |
| 2014/0145906 | A1* | 5/2014 | Kato | H01Q 7/00 343/867 |
| 2014/0152519 | A1* | 6/2014 | Buyuk-Kalender | H01Q 1/38 343/749 |
| 2014/0284386 | A1* | 9/2014 | Finn | B23K 26/361 343/866 |
| 2014/0284387 | A1* | 9/2014 | Finn | H01Q 7/00 235/492 |
| 2014/0285395 | A1* | 9/2014 | Alleysson | H01Q 7/00 343/866 |
| 2014/0300526 | A1* | 10/2014 | Rahman | H01Q 1/36 343/867 |
| 2014/0361086 | A1* | 12/2014 | Finn | H01Q 7/00 235/492 |
| 2015/0021402 | A1* | 1/2015 | Finn | H01Q 7/00 235/492 |
| 2015/0136858 | A1* | 5/2015 | Finn | B23K 26/361 235/492 |
| 2015/0269471 | A1* | 9/2015 | Finn | G06K 19/07754 29/601 |
| 2015/0278675 | A1* | 10/2015 | Finn | G06K 19/07783 29/601 |

OTHER PUBLICATIONS

Written Opinion (PCT/ISA/237) dated Jan. 12, 2017, by the European Patent Office as the International Searching Authority for International Application No. PCT/EP2016/076617.

* cited by examiner

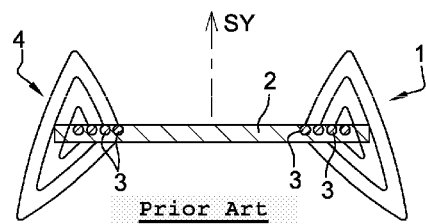
Fig. 1
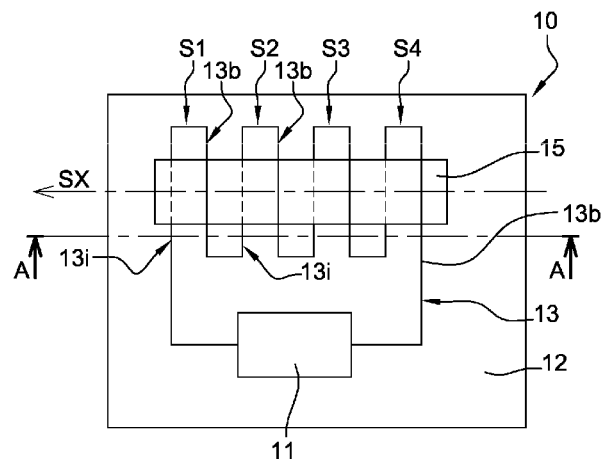
Fig. 2
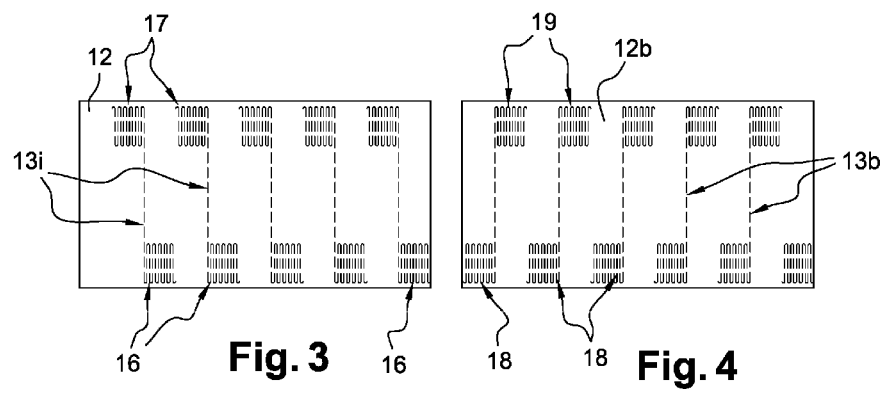
Fig. 3  Fig. 4

CROSS SECTION B-B

CROSS SECTION A-A

METHOD FOR MANUFACTURING A RADIOFREQUENCY ANTENNA ON A SUBSTRATE AND ANTENNA THUS OBTAINED

FIELD OF THE INVENTION

The invention relates to a method for manufacturing a radiofrequency antenna on a substrate and to the antenna thus obtained.

It preferably relates to the manufacturing of an antenna on a medium whose configuration allows for a field of action that includes emitting and/or receiving electromagnetic waves mainly oriented in the plane of an antenna substrate.

The invention also is aimed at manufacturing antenna substrates whose field of action may be three-dimensional.

More specifically, the invention relates to the field of substrates for radiofrequency antennas, such as electronic passports, travel documents, smart cards, tickets, radiofrequency tags, radiofrequency transponders, inserts (or inlays).

Such objects may among others comply with the ISO/IEC 14443 standard.

Prior Art

The production of a radiofrequency antenna in the form of electrically conductive spiral turns or tracks on a substrate is known in the contactless smart card or radio frequency identity device (RFID) industry. The antenna spiral turns or tracks may in particular be made by metal etching on a substrate or by embedding conductive wires, among others, using ultrasounds or any other deposition of conductive metal. The antenna is then connected to a radiofrequency module comprising a radiofrequency integrated circuit chip.

According to the shape of the antenna, it is thus possible to obtain radiofrequency transponders that are able to operate in accordance with the ISO 14443 or UHF standards.

Technical Problem

The substrates for radiofrequency chips known in the field of smart cards may have reduced fields of action depending on the manner in which the medium is placed in relation to the antenna of a radiofrequency proximity reader. For example, an RFID smart card or transport ticket must be placed flat opposite a radiofrequency reader to ensure proper coupling and good communication with the reader. If the card is turned in any other direction, its coupling will not be achieved as quickly.

The invention generally aims to achieve an economical method of manufacturing an antenna that allows radiofrequency communication irrespective of the orientation of its substrate with respect to a radiofrequency reader.

The purpose of the invention is to propose an economical structure (or one that is easy to produce) for a radiofrequency transponder comprising an antenna on a substrate and in which the transponder's field of action makes up for the insufficient field of action of current near field contactless cards, which comply with ISO 14433, among others.

Near field refers to a field whose communication range, for example, is less than about 1 m.

SUMMARY OF THE INVENTION

The invention consists in producing a spiral-shaped antenna on a plane substrate, preferably using current technology in the field of smart cards, the axis of the spiral being substantially in the plane of the substrate (or parallel to this plane) so that the field of action of the antenna is in this plane.

The aim of the invention therefore is a method for manufacturing an antenna for a radiofrequency transponder, said antenna comprising a spiral having turns extending at least in part over an insulating substrate, characterized in that it includes the step according to which at least a first portion of each turn is deposited on said substrate on a first plane level P1, at least a second portion of each turn being formed at a distance from the first plane level of the substrate, the axis of the spiral being parallel to the plane of the substrate.

According to further characteristics of the invention:

The first portion of each spiral turn is made from conductive wire

Each spiral turn includes a segment that is embedded in said substrate an alternation that is not embedded in said substrate, said alternation being relative to the embedded segment The non-embedded alternation extends over the plane of the substrate forming a loop. The loop may be more or less rounded or substantially flat.

The alternation is formed on a second substrate that is separate from the first and the second substrate is assembled to the first substrate so as to electrically connect the first portion of each spiral turn to the second portion or alternation of each turn The first portion of each spiral turn comprises a first terminal interconnection area at each end to interconnect a corresponding second terminal interconnection area on the second portion or alternation of turns when assembling the two substrates The invention also relates to an antenna obtained using the method and a portable electronic object that includes said antenna in a fixed or removable manner.

The portable electronic object may b a passport, a booklet, a smart card, a smart card in mini-card format, a mobile phone or tablet, a computer that includes the antenna on its printed circuit or in a removable manner.

BRIEF DESCRIPTION OF THE FIGURES

FIG. 1 shows a contactless smart card of the prior art

FIG. 2 shows an antenna in accordance with the first embodiment of the invention and obtained according to a first mode of implementation of the method FIGS. 3-6A show steps for implementing the method of the invention according to a second mode of implementation and the antenna obtained FIG. 7 schematically shows a cross section of FIG. 2

DESCRIPTION

Figure 5:
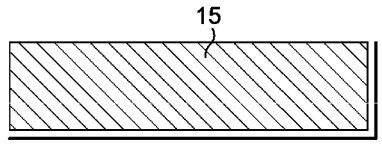

FIG. 1 shows a contactless smart card 1 of the prior art. It includes a plane medium 2 on which an antenna made of embedded wire is carried out in the form of a spiral comprising turns 3. The field of action of this spiral when coupled or emitting and/or receiving is oriented according to the axis SY, which is perpendicular to the plane of the card.

According to the prior art, one of the card's main faces must be placed substantially opposite a reader antenna to enable proper coupling and good radiofrequency communication in accordance with standard ISO 14443.

If the card is turned in any other direction, the required electromagnetic coupling may not be achieved.

FIG. 2 shows a configuration of an antenna 13 for a radiofrequency transponder according to a first embodiment of the invention. The antenna includes a spiral comprising turns S1-S4 extending at least in part over an insulating substrate 12.

The substrate may be of any insulating nature, e.g. PET plastic, PVC, PE, Teslin, synthetic fabric, nonwoven fabric.

According to a characteristic of the first mode of implementation, the method for manufacturing this antenna 13 implements a step in which at least a first portion 13i of each turn is deposited on the substrate 12 on a first plane level P1 of the substrate.

When etching, the antenna rests on the surface of the substrate. However, when the wire is embedded, the turns can be sunk in more or less deeply in relation to the main surface of the substrate. The antenna can be produced in the form of sewn, embroidered or bonded wire on the surface of the substrate. It may thus have planes P1 that correspond to first portions of spiral turns.

Moreover, the method provides for making or keeping at least a second portion 13b of each turn S1-S4 at a distance from the first plane level P1 of the substrate. The antenna thus arranged has a main axis SX of the spiral that is parallel to the plane P1 of the substrate in the vicinity of the substrate's surface.

In the example, it has been preferred to only make the first portion 13i of each turn S1-S4 from embedded conductive wire, in particular due to the good radiofrequency performance and to the precision of its implementation.

It can be observed that each turn S1-S4 comprises a segment 13i that is embedded in the substrate 12 and an alternation 13b relative to the segment 13i (which returns in the opposite direction relative to the path of the segment). This alternation 13b has been intentionally left non-embedded in the substrate 12 for the following reasons of obtaining loops of spiral turns.

In fact, according to an advantageous characteristic, the non-embedded alternation 13b extends over the plane P1 of the substrate 12 and allows for a loop to be formed over the plane of the substrate and which sinks into the substrate or adheres to it. The segments 13i pass under the core 15.

On FIGS. 3-6A, according to a second mode of implementation, the method of the inventions provides for a step according to which the alternation 13b is formed on a second substrate 12b (FIG. 4).

It also provides for a step according to which the second substrate 12b is assembled to the first substrate 12 so as to electrically connect the first portion 13i of each spiral turn S1-S4 to the second portion or alternation 13b of each turn.

In the example shown in FIG. 3, a plurality of patterns M1: 13i, 16, 17, which represent first portions 13i of spiral turns, are first made, in particular by embedding conductive wire. In this case, spiral turn halves are made. These portions 13i each include terminal interconnection areas 16, 17 at their respective ends. In this case, the interconnection areas are formed by narrow and short zigzags of embedded wire.

Other embodiments of interconnection areas and/or portions 13i are possible, in particular welded metal plates, etched areas, silk-screened areas, printed areas, etc. according to a technology that may or may not be identical to the one used to make the portions of spiral turns or tracks 13i.

In FIG. 4, similar patterns that correspond to the previous patterns are made using the same method(s) as previously or a different one. These patterns M2: 13b, 18, 19 are complementary to the patterns M1. They include alternations or second portions of spiral turns that are complementary to the portions or tracks 13i and areas 18, 19 at their respective ends.

These portions of spiral turns are thus made so that the first portion 13i of each turn S1-S4 comprises a first terminal interconnection area 16, 17 at each end to interconnect a corresponding second terminal interconnection area 18, 19 on the second portion or alternation 13b of turn when assembling the two substrates 12, 12b.

The electrical interconnection between the interconnection areas 16, 17, 18, 19 can be achieved through electrical conduction or capacitive effect.

In the first case, the wire is insulated by an insulating sheath and the interconnection areas merely need to be abraded mechanically or using a laser prior to being interconnected through electrical contact.

Where appropriate, an adhesive conductive material may be arranged between the conductive areas to be interconnected.

All that is required to achieve a capacitive interconnection is to assemble the substrates 12 and 12b with the areas opposite their corresponding range and to place a more or less thick adhesive layer between them depending on the capacitance value to be used.

According to one characteristic, the method may provide for a step in which a core 15 is placed to concentrate the electromagnetic flux of the spiral. This core is installed substantially in the axis SX of the spiral, between the first 13i and second portions 13b of each turn S1-S4.

Thus, for the first mode of implementation (FIG. 2) the core 15 (FIG. 5) merely needs to be slid under the alternations 13b making sure to lift them sufficiently, where appropriate.

The method may provide for forming the loops 13i at a greater or smaller height in relation to the plane of the substrate to make it easier to place the core when sliding it underneath.

For the second mode of implementation, it is possible to proceed by placing the core in the form of a thin plate on the first substrate 12 centred on the middle axis of the patterns M1.

The substrate of FIG. 4 is then placed on the substrate 12 of FIG. 3 so as to cover the core and to make each area 16, 17 interconnect with a corresponding area 18, 19 of each pattern M2.

Prior to lamination or assembly, an intermediate anisotropic adhesive may be applied onto at least one of the substrates at the level of the conductive areas, if they are interconnected through electrical conduction. A layer of normal adhesive may be applied elsewhere.

Figure 6:
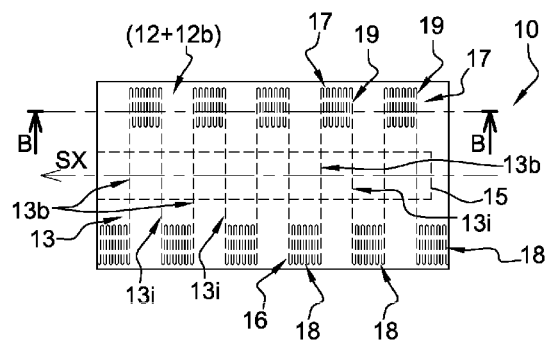
Figure 6A:
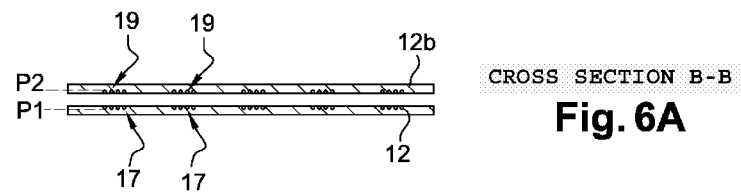

FIG. 6A shows a cross section of FIG. 6 along B-B prior to lamination of the substrates 12 and 12b. It can be seen that each interconnection area is arranged in line with its corresponding area.

The example shows substrates that include a single antenna but it is conceivable to assemble large-sized substrates that include a plurality of antennas which are then separated by cutting.

The method may thus be carried out reel to reel (mode of implementation not shown) according to the technology used for smart card modules.

It is thus possible to laminate together a first ribbon R1 comprising the first patterns M1 and then a ribbon comprising the core or merely the continuous core or the core that has not been carried over by transferring it with a support film which can be detached from the core.

A second ribbon R2 (or 12b) is then laminated over the assembly consisting of the first ribbon R1 (or 12) and the core (if it is required).

Each antenna thus made is then cut out in the form of an antenna module that works in parallel to the main plane of the module.

The parallel-working antenna module may then be placed on another substrate such as the body of a smart card.

Figure 8:
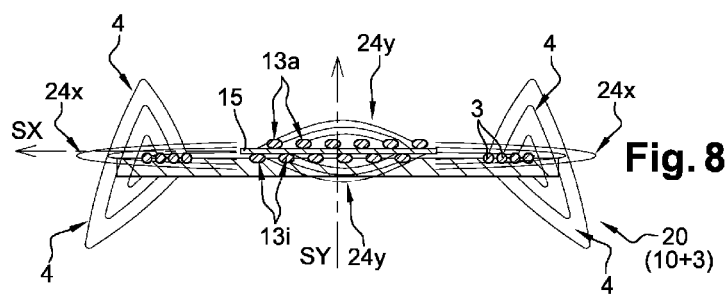
FIG. 8 shows the object of the previous figure combined with an antenna 3 of the prior art

Like any contactless module known from the prior art, this module can be connected to another conventional antenna (radiating perpendicularly to the main plane). For example, connection to the ends of the module's antenna or spiral can be achieved through thermo-compression to a circuit located on the other substrate. The circuit in FIG. 8 is another antenna made with embedded wire. The two antennas can be assembled in series or in parallel with respect to a radiofrequency chip connected to the antenna.

Where appropriate, the chip may be connected to the above antenna module.

The antenna module can be assembled in a smart card body, in particular by inserting it in a cavity opening into the surface of the card's body. Connection to the other antenna in the card's body can be carried out during insertion of the card.

Figure 7:
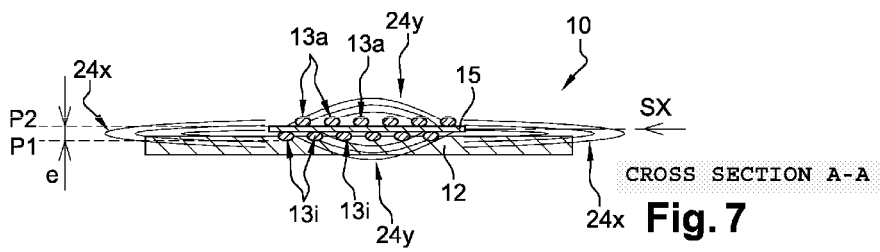

The module may have the same dimensions as a conventional module in accordance with ISO 7816 and include contact areas on the surface, e.g. on one of the external faces of the assembly in FIG. 6 or 7.

Insulating layers (or an insulating coating on the chip) may be added, where appropriate, on one of the faces or on the chip 11. The chip may be mounted as a flip-chip. FIG. 2 may represent the reverse side of a small-sized antenna module, regardless of whether it is intended to be inserted into a card body or not.

In FIG. 8, the method provides for associating the antenna of the invention with a conventional antenna 3 of the prior art shown in FIG. 1. In this configuration, the transponder has two preferred electromagnetic coupling axes SX and SY.

This embodiment, shown in FIG. 8, has the advantage of allowing for two types of antennas with complementary radiation to be made on the same substrate, in particular using embedded wire technology. The implementation of this embodiment thus is particularly economical and practical while allowing for very good radiofrequency performance.

A smart card comprising an insert according to FIG. 8 can now be placed in front of an ISO 14443 radiofrequency reader by putting one of its edges opposite the reader (in particular the edges of the smart card perpendicular to the axis of the reel or spiral 13).

The two antennas are preferably connected to the same radiofrequency chip. The electrical assembly of the two antennas may be a serial or parallel assembly.

The various electrical assemblies may require a capacity in the form of plates or integrated circuit SMD components to complement or not complement a capacitance value of the radiofrequency chip or hybrid chip (contact and contactless).

If necessary, the capacitive effect mentioned in FIG. 6 can be used to adjust the antenna assembly.

Thus, with the same radiofrequency transponder substrate according to FIG. 8, e.g. a contactless smart card, the invention allows for better coupling and better communication in all directions.

The invention thus allows designing any type of portable electronic object comprising the antenna in a fixed or removable manner. Such an object or device may be a passport, a booklet, a smart card or a smart card in mini-card format.

The antenna of the invention can be fitted in a mobile phone, tablet, computer, or any radiofrequency communication device of the invention, among others directly on the printed circuit of a device's motherboard or in removable form using a removable or other type of memory card.

The invention claimed is:

1. A method for manufacturing an antenna for a radiofrequency transponder, said antenna comprising a spiral having turns made of wire around a core and extending at least in part over an insulating substrate, the method comprising:
   depositing at least a first portion of each turn over said substrate at a plane level of a plane of the substrate, at least a second portion of each turn being formed or kept at a distance from the plane level of the plane of the substrate, the spiral being wound by way of each turn forming a loop around a main axis of the core, the main axis of the core being parallel to the plane of the substrate, wherein the second portion includes alternations of turns formed or arranged on an under side of the substrate,
   forming interconnection areas at respective ends of each turn formed by narrow and short zigzags of embedded wire turns whereby a first pattern of spiral turn halves is formed at a first end of each said first portion and a complementary pattern of spiral turn halves is formed at a second end of each said second portion;
   wherein all of the first and second portions are parallel to one another and are spaced from one another along a direction of the main axis of the core,
   wherein each turn of said first portion includes a segment embedded in said substrate and a non-embedded alternation of said second portion, the non-embedded alternation extending over the plane of the substrate, and the embedded segement under the plane of the substrate to form each said loop.

2. The method of claim 1, wherein said first portion of each turn is made from conductive wire.

3. The method of claim 1, wherein the second substrate is assembled to the first substrate so as to electrically connect the interconnection areas of said first portion of each turn to the the interconnection areas of said second portion of each turn.

4. The method of claim 3, wherein said first portion of each turn comprises a first terminal interconnection area at said first end to interconnect a corresponding second terminal interconnection area at said second end on the second portion of the turn when assembling the two substrates.

5. The method of claim 4, wherein the electrical interconnection between said interconnection areas is achieved by electrical conduction or by capacitive effect.

6. The method of claim 1, including a step for placing an electromagnetic flux concentrator core arranged substantially in the main axis of the spiral, between said first and second portions of each turn.

7. A method for manufacturing an antenna for a radiofrequency transponder, said antenna comprising a spiral having turns made of wire around a core, said core between a first substrate and a second, the method comprising:
   depositing at least a first portion of each turn on said first substrate at a first plane level of a plane of the first substrate, depositing at least a second portion of each turn on said second substrate at a second plane level of a plane of the second substrate,
maintaining a distance between the first substrate and a second substrate when depositing said first portion and said second portion
winding the spiral after each turn that forms a loop around a main axis of the core, the main axis of the core being parallel to the plane of the first substrate and the second substrate,
forming interconnection areas at respective ends of each turn by way of spiral turn halves thereby producing narrow and short zigzags of embedded wire turns wherein a first pattern is formed at a first end of each said first portion and a complementary second pattern is formed at a second end of each said second portion;
placing, or sliding, the core between the first substrate and the second substrate such that each area of the first pattern interconnects with a corresponding area of the second pattern;
wherein all of the first and second portions are parallel to one another and are spaced from one another along a direction of the main axis of the core,
wherein each turn of said first portion includes a segment embedded in said substrate and a non-embedded alternation of said second portion, the non-embedded alternation extending over the plane of the substrate, and the embedded segement under the plane of the substrate to form each said loop.

\* \* \* \* \*